US007216346B2

(12) United States Patent  
Bender et al.

(10) Patent No.: US 7,216,346 B2
(45) Date of Patent: May 8, 2007

(54) METHOD AND APPARATUS FOR MANAGING THREAD EXECUTION IN A MULTITHREAD APPLICATION

(75) Inventors: Ernest S. Bender, Saugerties, NY (US); Chun-Kwan K. Yee, Woodstock, NY (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 10/334,214

(22) Filed: Dec. 31, 2002

(65) Prior Publication Data

US 2004/0139432 A1 Jul. 15, 2004

(51) Int. Cl.
*G06F 9/46* (2006.01)
*G06F 13/24* (2006.01)

(52) U.S. Cl. .................. 718/102; 718/100; 719/313; 719/318; 710/260

(58) Field of Classification Search ........ 718/100–108; 719/318, 313; 710/260
See application file for complete search history.

(56) References Cited

U.S. PATENT DOCUMENTS

| 5,430,850 | A | | 7/1995 | Papadopoulos et al. ..... 395/375 |
| 5,515,538 | A | * | 5/1996 | Kleiman ..................... 710/260 |
| 5,560,029 | A | | 9/1996 | Papadopoulos et al. ..... 395/800 |
| 5,632,032 | A | * | 5/1997 | Ault et al. ................... 718/100 |
| 5,632,036 | A | * | 5/1997 | England et al. ............. 718/106 |
| 5,666,533 | A | | 9/1997 | Horiguchi et al. .......... 395/670 |
| 5,706,515 | A | | 1/1998 | Connelly et al. ........... 395/676 |
| 5,742,822 | A | | 4/1998 | Motomura ................... 395/672 |

(Continued)

FOREIGN PATENT DOCUMENTS

JP 11282815 A 10/1999

(Continued)

OTHER PUBLICATIONS

Muller, "A Library Implementation of Posix Threads Under Unix", USENIX, 1993, pp. 29-42.*

(Continued)

*Primary Examiner*—Meng-Al T. An
*Assistant Examiner*—Jennifer N. To
(74) *Attorney, Agent, or Firm*—William A. Kinnaman, Jr.

(57) ABSTRACT

A method for managing the suspension and resumption of threads on an individual basis in an information handling system having an operating system (OS) kernel and a user process having multiple threads of execution. An originating thread issues a pthread_kill( ) service request to the OS kernel to send a specified signal (thread-stop or thread-continue) to a specified target thread within the same process to suspend or resume execution of the target thread. More particularly, in response to a request from a thread to suspend the execution of the target thread, the OS kernel sends a thread-stop signal (SIGTHSTOP) to the target thread, transferring control within the target thread from a normally executing program portion to a signal interrupt routine. Upon gaining control, the signal interrupt routine issues a service request to the kernel to stop the target thread. In response to a request from a thread to resume execution of the target thread, the OS kernel sends a thread-continue signal (SIGTHCONT) to the target thread to post the waiting target thread and return control to the signal interrupt routine. Upon regaining control, the signal interrupt routine returns control to the program at the point of interrupt.

10 Claims, 1 Drawing Sheet

U.S. PATENT DOCUMENTS

| | | | |
|---|---|---|---|
| 6,119,145 A | 9/2000 | Ikeda et al. | 709/203 |
| 6,128,640 A | 10/2000 | Kleinman | 709/102 |
| 6,205,414 B1 | 3/2001 | Forsman et al. | 703/26 |
| 6,457,064 B1 * | 9/2002 | Huff et al. | 719/318 |
| 6,708,194 B1 * | 3/2004 | Korn | 718/100 |
| 6,934,950 B1 * | 8/2005 | Tuel et al. | 718/102 |

FOREIGN PATENT DOCUMENTS

| | | |
|---|---|---|
| JP | 2000047887 A | 2/2000 |
| JP | 2001134466 A | 5/2001 |
| WO | WO9302414 A | 2/1993 |
| WO | WO200001170 | 1/2000 |

OTHER PUBLICATIONS

Ravenbrook, "Design of the Posix Thread Extensions for MPS", Available at RAVENBROOK.COM/PROJECT/MPS/MASTER/DESIGN/PTHREADEXT/, 2000, pp. 1-6.*

IBM Technical Disclosure Bulletin, vol. 36, No. 11, Nov. 1993, pp. 483-485, S. Bender and D. Hughes.

UNIX Network Programming, W. Richard Stevens, 1990, PTR Prentice-Hall, Inc. , pp. 43-53. Base Operating System and Extensions Technical Reference, vol. 1, pp. 1-2.

* cited by examiner

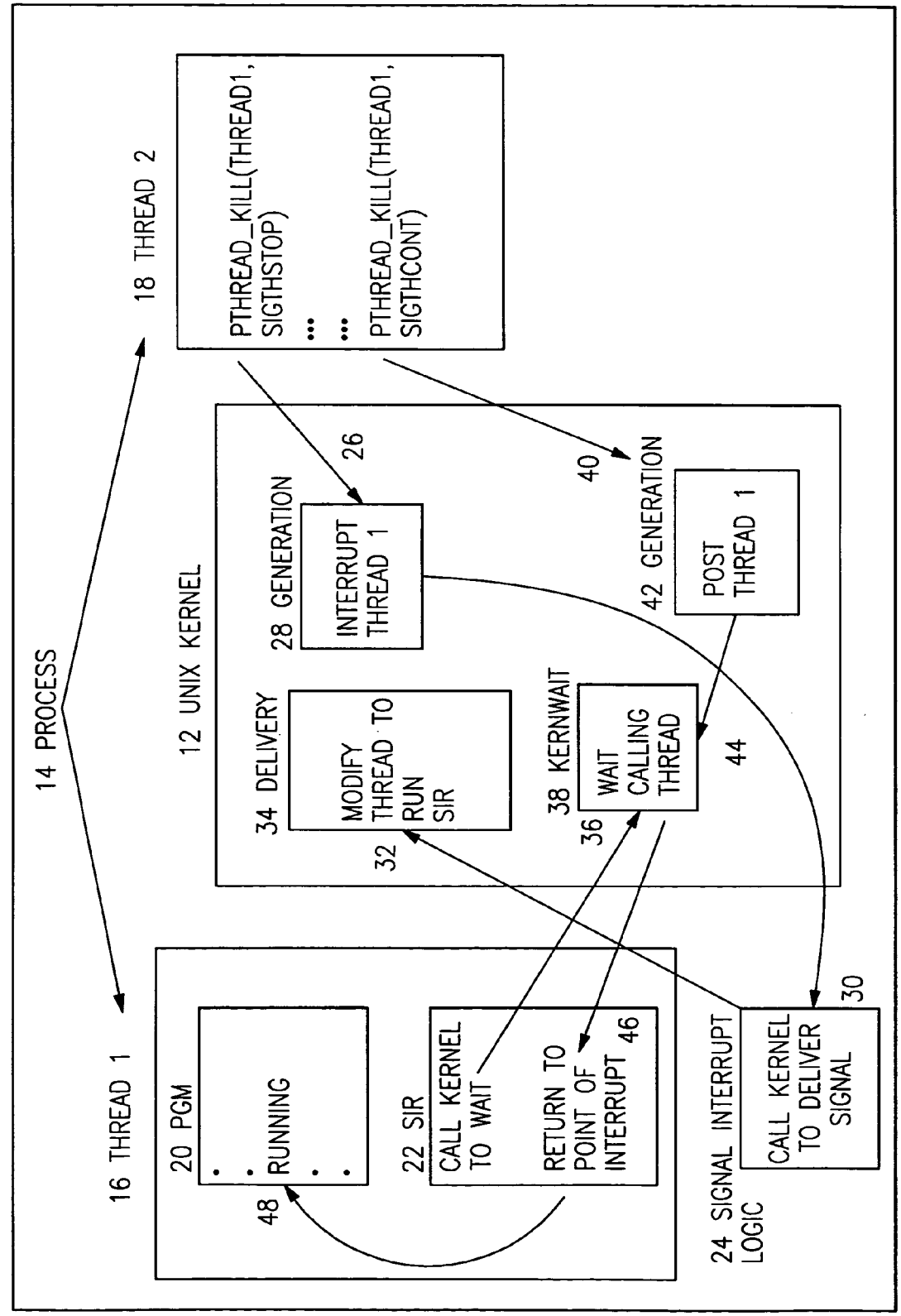

METHOD AND APPARATUS FOR MANAGING THREAD EXECUTION IN A MULTITHREAD APPLICATION

BACKGROUND OF THE INVENTION

1. Field of the Invention

This invention relates to a method and apparatus for managing thread execution in a multithreaded application. More particularly, it relates to a method and apparatus for controlling the suspension and resumption of individual threads using standard POSIX mechanisms.

2. Description of the Related Art

Multithreaded applications are a well-known feature of modern computer systems, especially systems using UNIX-based operating systems. Multithreaded applications have multiple threads of execution, each of which may be performing an individual task relatively independently of other threads of the same application. For example, individual threads of a server process may be processing units of work received from different clients.

Signals are one of the means such processes and threads use to communicate with one another. At the process level, signals are a well-known means of interprocess communication (IPC), being described, for example, at pages 43–53 of W. R. Stevens, *UNIX Network Programming* (1990), incorporated herein by reference. As described in that reference, a signal is a notification to a process that an event has occurred. Signals may initiate such actions as terminating execution (e.g., SIGKILL, SIGTERM), suspending execution (SIGSTOP) or resuming execution of a suspended process (SIGCONT). To send a signal to another process, a process uses the services of the operating system kernel to generate a signal and direct it to the intended recipient. Thus, in the UNIX system defined by the UNIX System Services (USS) component of the IBM z/OS operating system, to send a signal to a process, a process may issue a kill( ) service request to the kernel specifying the target process and the signal to be sent. This is described in such references as the IBM publications *z/OS UNIX System Services Programming: Assembler Callable Services Reference*, SA22-7803-02 (Mar. 2002), and *z/OS C/C++ Run-Time Library Reference*, SA22-7821-02 (Mar. 2002), both incorporated herein by reference.

The action taken by the target process upon receiving the signal depends on the signal in question, as indicated above. In general, a process receiving a signal can do one of several things. It can "catch" the signal by passing control to a routine known as a signal handler to perform a specified function as determined by the target process. Alternatively, the target process can simply ignore the received signal, unless it is a signal such as SIGKILL or SIGSTOP that cannot be ignored. Finally, the target process can allow a default action to occur, such as process termination.

Signals may be sent not only between processes, but between different threads of a single process as well. Thus, in the UNIX System Services component of the IBM Z/OS operating system, to send a signal to a particular thread of a process, an originating thread of the same process may issue a pthread_kill( ) service request to the kernel specifying the target thread and the signal to be sent. Here too, the action taken by the target thread depends on the particular signal received.

With this background discussion of threads and signals, we turn to the problem addressed by the present invention. In conventional multithreaded UNIX applications, users are limited in how they can safely stop an individual thread. Current POSIX semantics allow for only an entire process (all threads) to be stopped via a SIGSTOP, SIGTTOU, SIGTTIN, or SIGTSTP signal. This is true even if the "stop" signal is directed at an individual thread via the pthread_kill( ) service. Likewise, the SIGCONT signal will continue all threads in a multithreaded stopped process. Neither of these existing POSIX signal mechanisms allows multithreaded applications to stop and start individual threads.

There are existing mechanisms for managing the execution of an individual task or thread. In UNIX systems, for example, there are services that allow threads to serialize with each other, condition variable and mutex services being probably the most widely used. However, these services require cooperative logic to be in place on the target thread.

SUMMARY OF THE INVENTION

In general, the present invention relates to a method and apparatus for managing the suspension and resumption of threads on an individual basis in an information handling system having an operating system (OS) kernel and a user process having multiple threads of execution. In accordance with the invention, the OS kernel, in response to receiving a request from one of the threads to alter the execution state of a specified target thread of the user process, sends a signal to the specified target thread of the user process to alter the execution state of the specified target thread without sending a signal to or altering the execution state of any unspecified thread of the user process.

The present invention gives multithreaded applications the ability to stop and start individual threads. To provide this new capability using POSIX signal mechanisms, in a preferred embodiment an originating thread issues a service request to the OS kernel to send a specified signal (thread-stop or thread-continue) to a specified target thread within the same process to suspend or resume execution of the target thread. Thus, in response to a request from a thread to suspend the execution of the target thread, the OS kernel sends a thread-stop signal to the target thread, transferring control within the target thread from a normally executing program portion to a signal interrupt routine (SIR). Upon gaining control, the signal interrupt routine issues a service request to the kernel to stop the target thread. Similarly, in response to a request from a thread to resume execution of the target thread, the OS kernel sends a thread-continue signal to the target thread to post the waiting target thread and return control to the signal interrupt routine. Upon regaining control, the signal interrupt routine returns control to the program at the point of interrupt.

In a preferred embodiment of the invention, two new signals—SIGTHSTOP (thread-stop) and SIGTHCONT (thread-continue)—are defined, and the pthread_kill( ) service is used to send either a SIGTHSTOP or SIGTHCONT signal to the target thread. (The names of the service and the signals are arbitrary, or course, and any other names could be used provided equivalent functions are performed.) These two new signals work generally like the SIGSTOP and SIGCONT signals described above, except that the scope of their action is confined to the target thread.

POSIX signal services are widely used and well understood by UNIX programmers. By providing a signal-based solution to the task of managing thread execution, much like processes are managed with SIGSTOP and SIGCONT, the present invention conforms well to UNIX-style programming. Using signals in this sense allows a "controlling" thread to manage one or more threads in the same process without additional target thread application logic. The target threads can be stopped and continued asynchronously just as POSIX processes are stopped and continued conventionally. Also, as with existing semantics for stopping and continuing a process, the stopping and continuing of a thread does not disrupt the functioning of the target thread. And in contrast to the condition variable and mutex services mentioned above, the present invention does not require cooperative logic to be in place on the target thread.

BRIEF DESCRIPTION OF THE DRAWINGS

FIG. 1 is a schematic block diagram of the software components of a computer system incorporating the present invention.

DESCRIPTION OF THE PREFERRED EMBODIMENT

FIG. 1 is a schematic block diagram of the software components of a computer system 10 incorporating the present invention. The hardware on which the software components run is conventional and is therefore not shown. Executing on system 10 are an operating system (OS) kernel 12 and a user process 14 containing at least a first thread 16 (thread 1) and a second thread 18 (thread 2). OS kernel 12 may be a UNIX kernel such as the UNIX System Services component of the IBM z/OS operating system, executing on an IBM eServer zSeries server (not shown). The present invention, however, is not limited to systems with UNIX kernels. As discussed in the background portion above, OS kernel 12 performs such system services as the kill( ) service for sending a specified signal to a specified target process and the pthread_kill( ) service for sending a specified signal to a specified target thread.

In accordance with the present invention, two new thread-scoped signals, SIGTHSTOP and SIGTHCONT, are provided. As a preliminary the discussing how these signals are implemented, their syntax and semantics will be briefly described.

For the thread-stop signal the syntax is:

pthread_kill(thread_id, sigthstop)

where thread_id is a unique identifier of the target thread (within the process) and sigthstop is a value uniquely associated with the SIGTHSTOP signal. Similarly, for the thread-stop signal the syntax is:

pthread_kill(thread_id, sigthcont)

where thread_id is the unique identifier of the target thread and sigthcont is a value uniquely associated with the SIGTHCONT signal.

The signals SIGTHSTOP and SIGTHCONT are sent using the pthread_kill( ) service and have an effective scope of a single thread rather than a whole process. Thus, the service request pthread_kill(thread_id, sigthstop) will cause the thread specified by thread_id to be stopped, while the service request pthread_kill(thread_id, sigthcont) will cause the specified thread to be resumed.

The implementation of the signals of the present invention will now be described. In the example that follows, it will be assumed that thread 18 is the originating thread and thread 16 is the target thread, although in general any thread of a user process 14 may target any other thread of the same user process in the manner described herein. Target thread 16 contains a normally executing program portion 20, as well as a signal interrupt routine (SIR) 22 and signal interrupt logic 24. The normally executing program portion 20 is simply the program portion executing at the time of interruption, and the function it may be performing is irrelevant to the present invention. Signal interrupt routine 22 obtains control of execution of the thread 18 upon the delivery of a signal from the OS kernel 12 to the thread 18, as described more particularly below. Signal interrupt logic 24 contains logic (i.e., programming code) for transferring control from the normally executing program portion 20 to the signal interrupt routine 22 in response to a signal received from the OS kernel 12. Signal interrupt routine 22 and signal interrupt logic 24 handle all signals directed to the thread 18; however, only the portions that are relevant to the SIGTHSTOP and SIGTHCONT signals of the present invention are described herein.

In brief, when a thread-stop signal SIGTHSTOP is issued against thread 16, the kernel 12 passes the signal to the signal interrupt routine 22, which issues an internal kernel service call to the kernel 12 to stop the thread 16 at an appropriate time. When a thread-continue signal SIGTHCONT is later issued against the thread 16, the kernel 12 posts the waiting thread 16 to return control to the signal interrupt routine 22, which returns control to the program 20 at the point of interrupt.

More particularly, to suspend the execution of the target thread 16, the originating thread 18 issues a pthread_kill( ) service request 26 to the kernel 12. As shown in the FIGURE, the service request 26 identifies both the target thread 16 (thread 1) and the signal (SIGTHSTOP) being sent to the target thread 16. Interrupt generation logic 28 of the kernel 12 fields the request 26 and sends an external interrupt 30 to the signal interrupt logic 24 of thread 16.

Signal interrupt logic 24 halts the normally executing program 20 on thread 16 and calls at 32 a kernel delivery routine 34. Delivery routine 34 modifies the program context of thread 16—i.e., the program status word (PSW) and associated registers in the zSeries machine referenced above—to run signal interrupt routine 22. Interrupt logic 24 then exits and the kernel dispatcher (not separately shown) returns control to the user task with the signal interrupt routine 22 in control.

Signal interrupt routine 22 records interrupt data and determines whether the application is in a critical code section that must complete. If not, the signal interrupt routine 22 issues a "stop me" pthread_quiesce call 36 to a kernel wait service 38 (KernWait) to wait the thread 16. If the application is in a critical code section of logic, then the signal interrupt routine 22 defers the calling of the kernel wait service 38 until it is safe to do so. In either event, when it is called wait service 38 places thread 16 in a stopped state.

At some future point, thread 18 issues a second pthread_kill( ) service request 40 to the kernel 12 to continue the stopped thread 16. As shown in the FIGURE, this second service request 40 identifies both the target thread 16 (thread 1) and the signal (SIGTHCONT) being sent to the target thread 16. Post generation logic 42 of the kernel 12 responds to this request to post thread 16, which is still waiting in the kernel 12. This is done at 44 by notifying the KernWait service 38, which returns control at 46 to the signal interrupt routine 22. Signal interrupt routine 22 in turn returns at 48 to the user program 20 at the point of the original interrupt. Thread 16 is unaware that it was stopped.

From the above discussion, it will be seen that interrupt generation logic 28 and kernel delivery routine 34 function as thread-stop logic for sending a SIGTHSTOP signal to the target thread to suspend the thread, while post generation logic 42 functions as thread-continue logic for sending a SIGTHCONT signal to the target thread to resume the thread.

In the embodiment shown, SIGTHSTOP and SIGTHCONT are processed in a manner that is compatible with existing POSIX standards, so that threads that are blocking on other functions may subsequently be stopped and continued using SIGTHSTOP and SIGTHCONT without any adverse effects on the target thread. That is to say, if the target thread were in a sleep( ) and were stopped then continued, the sleep( ) service would not be prematurely woken up. The details of this may be found in S. Bender et al., "Dual Level Wait", *IBM Technical Disclosure Bulletin*, vol. 36, no. 11, November 1993, pages 483–485, incorporated herein by reference.

In the embodiment shown, the SIGTHSTOP and SIGTHCONT signals are non-catchable, non-blockable, and cannot be ignored; the target thread must suspend or resume execution, depending on the signal. Also, like other signals, they are not cumulative or stackable. Multiple SIGTHSTOP signals to the same target thread are tolerated with no incremental effect, but a single SIGTHCONT sent to the same thread will reactivate it, even if it has been the earlier target of several SIGTHSTOP signals. Since SIGTHSTOP signals are not queued, subsequent signals are ignored by the kernel.

In the embodiment shown, the pthread_kill(thread_id, sigthcont) command is issued against another thread of the same process. Since SIGTHSTOP only stops a single thread in the process, any other running thread in the process can issue the SIGTHCONT to resume the stopped thread. One should avoid having all the threads in the process stopped using SIGTHSTOP, for then the process is virtually hung. No thread from another process can send a signal to wake them up. The only thing that can be done is to manually kill the threads.

While a particular embodiment has been shown and described, various modifications will be apparent to those skilled in the art. Thus, while the invention has been described in the context of a UNIX-based operating system, it is not limited to such operating systems. Also, as noted above, the signals and service requests used may have different names, so long as similar functions are performed. Further, while the pthread_kill( ) service described operates on only a single target thread, it could be modified to operate on a plurality of such threads as specified, for example, in a list. In such a case, signals would be sent only to the specified threads and not to any unspecified thread of the user process.

What is claimed is:

1. In an information handling system having an operating system kernel and a user process having multiple threads of execution including a target thread, the target thread having a program context and an execution state and the target thread containing a normally executing program portion, a signal interrupt routine for obtaining control of execution of the target thread upon delivery of a signal from the operating system kernel to the target thread, and signal interrupt logic for transferring control from the normally executing program portion to the signal interrupt routine in response to a signal received from the operating system kernel, a method for managing the execution of the target thread without altering the execution state of any unspecified thread of the user process or requiring cooperative logic on the target thread, the method being performed by the operating system kernel and comprising the steps of:

responsive to receiving a request from one of the multiple threads to suspend execution of the target thread, sending an external interrupt to the signal interrupt logic of the target thread to cause the signal interrupt logic to halt the normally executing program and issue a first service call to the operating system kernel; and responsive to receiving the first service call, modifying the program context of the target thread to cause the target thread to execute the signal interrupt routine, the signal interrupt routine, upon being executed, issuing a second service call to the operating system kernel to suspend execution of the target thread.

2. The method of claim 1 in which said request specifies a target thread and a type of signal to be sent to the target thread.

3. The method of claim 1 in which said request specifies a desired alteration of the execution state of said target thread.

4. The method of claim 1 in which the second service call is issued to wait service logic associated with the operating system kernel to suspend the target thread.

5. The method of claim 4, further comprising the step of:
responsive to receiving a request from one of the multiple threads to resume execution of the target thread, notifying the wait service logic to cause the wait service logic to return control of execution to the signal interrupt routine of the target thread, the signal interrupt routine, upon regaining control, returning control of execution to the normally executing portion of the target thread.

6. A program storage device readable by a machine, tangibly embodying a program of instructions executable by the machine to perform method steps for managing the execution of a target thread without altering the execution state of any unspecified thread of a user process or requiring cooperative logic on the target thread in an information handling system having an operating system kernel and a user process having multiple threads of execution including the target thread, the target thread having a program context and an execution state and the target thread containing a normally executing program portion, a signal interrupt routine for obtaining control of execution of the target thread upon delivery of a signal from the operating system kernel to the target thread, and signal interrupt logic for transferring control from the normally executing program portion to the signal interrupt routine in response to a signal received from the operating system kernel, the method steps being performed by the operating system kernel and comprising:

responsive to receiving a request from one of the multiple threads to suspend execution of the target thread, sending an external interrupt to the signal interrupt logic of the target thread to cause the signal interrupt logic to halt the normally executing program and issue a first service call to the operating system kernel; and responsive to receiving the first service call, modifying the program context of the target thread to cause the target thread to execute the signal interrupt routine, the signal interrupt routine, upon being executed, issuing a second service call to the operating system kernel to suspend execution of the target thread.

7. The program storage device of claim 6 in which the second service call is issued to wait service logic associated with the operating system kernel to suspend the target thread, the method steps further comprising:

responsive to receiving a request from one of the multiple threads to resume execution of the target thread, notifying the wait service logic to cause the wait service logic to return control of execution to the signal interrupt routine of the target thread, the signal interrupt routine, upon regaining control, returning control of execution to the normally executing portion of the target thread.

8. In an information handling system having a processor, an operating system kernel and a user process having multiple threads of execution including a target thread, the target thread having a program context and an execution state and the target thread containing a normally executing program portion, a signal interrupt routine for obtaining control of execution of the target thread upon delivery of a signal from the operating system kernel to the target thread, and signal interrupt logic for transferring control from the formally executing program portion to the signal interrupt routine in response to a signal received from the operating system kernel, apparatus for managing the execution of the target thread without altering the execution state of any unspecified thread of the user process or requiring cooperative logic on the target thread, the apparatus being associated with the operating system kernel and comprising:

interrupt generation logic responsive to receiving a request from one of the multiple threads to suspend execution of the target thread for sending an external interrupt to the signal interrupt logic of the target thread to cause the signal interrupt logic to halt the normally executing program and issue a first service call to the operating system, kernel; and signal delivery logic responsive to the first service call for modifying the program context of the target thread to cause the target thread to execute the signal interrupt routine, the signal interrupt routine, upon being executed, issuing a second service call to the operating system kernel to suspend execution of the target thread.

9. The apparatus of claim 8 in which the signal delivery logic issues the second service call to wait service logic associated with the operating system kernel to suspend the target thread.

10. The apparatus of claim 9, further comprising:

post generation logic responsive to receiving a request from one of the multiple threads to resume execution of the target thread for notifying the wait service logic to cause the wait service logic to return control of execution to the signal interrupt routine of the target thread, the signal interrupt routine, upon regaining control, returning control of execution to the normally executing portion of the target thread.

* * * * *